(12) United States Patent
Buchholz et al.

(10) Patent No.: US 8,635,944 B2
(45) Date of Patent: Jan. 28, 2014

(54) COFFEE MACHINE FOR THE PREPARATION OF A FRESH, COLD, COFFEE-BASED BEVERAGE

(75) Inventors: Bernd Buchholz, Rahden (DE); Jens Schmalkuche, Steinhagen (DE); Peter Tintelnot, Minden (DE)

(73) Assignee: Melitta SystemService GmbH & Co. KG, Minden (DE)

( * ) Notice: Subject to any disclaimer, the term of this patent is extended or adjusted under 35 U.S.C. 154(b) by 777 days.

(21) Appl. No.: 12/754,993

(22) Filed: Apr. 6, 2010

(65) Prior Publication Data

US 2010/0260907 A1 Oct. 14, 2010

(30) Foreign Application Priority Data

Apr. 8, 2009 (DE) .......................... 10 2009 016 506

(51) Int. Cl.
*A47J 31/40* (2006.01)
(52) U.S. Cl.
USPC ................... 99/280; 99/286; 99/288; 99/299; 99/297
(58) Field of Classification Search
USPC ............................. 99/280, 286, 288, 299, 297
See application file for complete search history.

(56) References Cited

U.S. PATENT DOCUMENTS

| | | | |
|---|---|---|---|
| 4,757,752 A | | 7/1988 | Robins et al. |
| 4,920,871 A | | 5/1990 | Anson et al. |
| 5,113,752 A | | 5/1992 | Brewer |
| 5,127,318 A | * | 7/1992 | Selby, III ........................ 99/295 |
| 5,463,934 A | * | 11/1995 | Locati .............................. 99/286 |
| 5,724,882 A | * | 3/1998 | Gallas et al. .................... 99/285 |
| 5,778,765 A | * | 7/1998 | Klawuhn et al. ................ 99/290 |
| 5,803,320 A | | 9/1998 | Cutting et al. |
| 6,099,878 A | * | 8/2000 | Arksey ........................... 426/231 |
| 6,253,664 B1 | * | 7/2001 | Giannelli ..................... 99/302 P |
| 6,387,424 B2 | * | 5/2002 | Funk .............................. 426/231 |
| 6,726,947 B1 | * | 4/2004 | Gutwein et al. ............... 426/433 |
| 6,758,130 B2 | * | 7/2004 | Sargent et al. ................... 99/295 |
| 6,759,072 B1 | * | 7/2004 | Gutwein et al. ............... 426/433 |
| 6,779,435 B1 | * | 8/2004 | Iacobucci .................... 99/302 R |
| 6,808,731 B1 | * | 10/2004 | Gutwein et al. ............... 426/433 |

(Continued)

FOREIGN PATENT DOCUMENTS

| | | |
|---|---|---|
| DE | 44 09 030 C2 | 1/1995 |
| JP | 5-120545 * | 5/1993 |
| WO | WO-01/12035 A2 | 2/2001 |

OTHER PUBLICATIONS

Communication from the European Patent Office, dated May 27, 2011, issued in connection with counterpart European Patent Application No. EP 10 15 5806.

*Primary Examiner* — Anthony Weier
(74) *Attorney, Agent, or Firm* — Venable LLP; Robert Kinberg; Tamatane J. Aga

(57) ABSTRACT

A method for producing a fresh, cold, coffee-based beverage using a predetermined amount of ground coffee, includes: feeding a predetermined amount of ground coffee into a brewing chamber; preparing a coffee concentrate with the supplied predetermined amount of ground coffee with a brewing operation in the brewing chamber, wherein the prepared coffee concentrate constitutes a specifiable multiple (VK) of a concentration (KN) for a normal drinking quality for filtered coffee at approximately 1.2 to 1.4% dry substance share; and mixing the prepared coffee concentrate with an amount of water which corresponds to a specifiable multiple (VM) of the amount of the prepared fresh coffee concentrate to prepare the fresh, cold, coffee-based beverage.

11 Claims, 2 Drawing Sheets

(56) References Cited

U.S. PATENT DOCUMENTS

| | | | |
|---|---|---|---|
| 6,990,891 B2 * | 1/2006 | Tebo, Jr. | 99/295 |
| 7,017,472 B2 * | 3/2006 | Grant et al. | 99/282 |
| 7,201,098 B2 * | 4/2007 | Wang | 99/286 |
| 7,419,692 B1 * | 9/2008 | Kalenian | 426/433 |
| 7,654,191 B2 * | 2/2010 | Greenwald et al. | 99/275 |
| 8,062,684 B2 * | 11/2011 | Gutwein et al. | 426/433 |
| 2008/0282897 A1 * | 11/2008 | Webster et al. | 99/280 |
| 2009/0165655 A1 * | 7/2009 | Aonuma | 99/290 |

\* cited by examiner

US 8,635,944 B2

COFFEE MACHINE FOR THE PREPARATION OF A FRESH, COLD, COFFEE-BASED BEVERAGE

CROSS-REFERENCE TO RELATED APPLICATION

This application claims the priority of German Patent Application No. 10 2009 016 506.1, filed on Apr. 8, 2009, the subject matter of which is incorporated herein by reference.

BACKGROUND OF THE INVENTION

The invention relates to a method for preparation of a fresh, cold, coffee-based beverage, using a predetermined amount of coffee grounds. The invention furthermore relates to a corresponding, fully automatic, coffee machine which may be of the piston-type. Fresh coffee-based beverages can be produced in the standard way, for example with a filter coffee machine. In addition, fresh coffee-based beverages can also be prepared with the aid of piston-type machines (so-called specialty machines). Insulated containers with a corresponding warming unit are necessary to keep larger amounts of filtered coffee ready for use.

Piston-type machines produce coffee-based beverages with a high share of turbid and suspended materials, which are not desirable for a typical filtered coffee. The reason for this is that piston-type machines push the complete beverage amount with high pressure through a brewing unit, wherein a small amount of hot water, which is clearly lower than the amount guided through the brewing unit, is added later on if necessary, for example via a bypass line. The turbid and suspended materials dissolved out of the coffee grounds during this process then enter the beverage ready for drinking. These turbid and suspended materials, however, are desired for products prepared with a piston-type machine, for example for espresso and Schümli products (wherein beans by Julia Schümli are especially desired for these products). For that reason, these types of machines could not, so far, be used for the preparation of products similar to filtered coffee.

German patent document DE 44 09 030 C2 describes a method for the production of a coffee-based beverage, as well as a suitable coffee machine provided with a bypass. The coffee-based beverage is prepared using a predetermined amount of ground coffee and a coordinated amount of hot water, wherein only a portion of the hot water is guided through the coffee grounds for the extraction and then flows into a storage container. The remaining partial amount bypasses the coffee grounds and flows directly into the storage container. The amount flowing through the bypass line is controlled such that at all times a drinkable coffee quality exists inside the storage container. An attempt is made with this method to compensate for fluctuations in the coffee strength during the brewing process.

One known option for preparing a cold coffee-based beverage is the preparation of a specialty coffee, preferably an espresso, with the aid of a piston-type machine and subsequently pouring it over ice cubes. This type of preparation is characterized by the combination of ice cubes with a smaller amount of coffee, wherein the special drinking experience above all is based on the existing, non-melted ice.

With a different method for preparing a cold coffee-based beverage, for example, regular filtered coffee is produced with a filter coffee machine and is then filled into containers in which it is allowed to cool down to room temperature over a longer period of time. The coffee cooled down in this way is then removed from the containers and, if applicable, is served while filled with ice. These types of beverages, however, are no longer fresh at the time when they are dispensed because of the relatively long cooling down period.

The aforementioned method furthermore requires the storage of large amounts of brewed filter coffee since the cooling down period is relatively long, wherein furthermore cooling agents for keeping the beverage cool can require additional energy.

SUMMARY OF THE INVENTION

It is therefore an object of the present invention to provide an improved method for producing a fresh, cold, coffee-based beverage, and to provide an improved coffee machine for use with this method.

According to the intention, a freshly brewed cold coffee-based beverage may be prepared with the aid of a coffee machine, for example, a piston-type coffee machine (specialty coffee machine), by freshly preparing a small amount of warm, extremely concentrated extract of coffee and mixing it proportionally with an excessive amount of cold water, so as to prepare a pleasantly cool, drinkable coffee-based beverage which has a dry substance share and taste that generally obtained with filtered coffee.

According to one aspect of the invention, there is provide a method for producing a fresh, cold, coffee-based beverage using a predetermined amount of ground coffee, which in one embodiment includes: feeding a predetermined amount of ground coffee into a brewing chamber; preparing a coffee concentrate with the supplied predetermined amount of ground coffee with a brewing operation in the brewing chamber, wherein the prepared coffee concentrate constitutes a specifiable multiple (VK) of a concentration (KN) for a normal drinking quality for filtered coffee at approximately 1.2 to 1.4% dry substance share; and mixing the prepared coffee concentrate with an amount of water which corresponds to a specifiable multiple (VM) of the amount of the prepared fresh coffee concentrate to prepare the fresh, cold, coffee-based beverage.

According to a further aspect of the invention there is provided an automatically controlled coffee machine for preparing a fresh, cold, coffee-based beverage, which in one embodiment includes: a storage container for ground coffee or whole-bean coffee ground as needed with a grinding device; a pressure-control device to provide a required water pressure; a brewing chamber to prepare fresh coffee concentrate from the ground coffee; a metering device to meter the ground coffee from the storage device or the grinding device into the brewing chamber; a hot water feeding tube connected to the brewing chamber to pre-brew and brew the coffee concentrate; a monitoring unit to determine a concentration for the brewed coffee concentrate; a beverage dispenser connected to the brewing chamber to dispense the brewed coffee concentrate; a cold water feeding tube connected to the dispenser; and a mixing chamber to mix the coffee concentrate with the cold water.

The coffee machine may be a piston-type coffee machine. The coffee machine may comprises a beverage outlet connected to the brewing chamber and the cold water feed-in for dispensing fresh coffee-based beverages, preferably in individual portions or multiple portions to be dispensed either directly or to be stored in a container as available supply.

By dispensing a freshly prepared cold beverage, the freshness aspect is clearly improved as compared to the traditional method.

Furthermore achieved is a considerable reduction in the required storage volume and the number of components needed for cooling down cold coffee-based beverages since the beverages are prepared as need-based.

As a result of the mixing with cold water, preferably tap water, an active cooling of the beverage is not required during the preparation of a fresh, cold coffee-based beverage and no waiting or cooling period is necessary. The temperature of the dispensed fresh, cold, coffee-based beverage is approximately the temperature of the available cold water, wherein the dispensing temperature is preferably at most about 15° C., even more preferable at most about 10° C. and especially preferred at most about 5° C. above the cold water temperature.

Preparing the extremely small amount of hot coffee concentrate, as compared to the amount of hot coffee prepared during a normal brewing operation, requires a considerably lower amount of energy for cooling a fresh cold coffee-based beverage as compared to the traditional method.

In addition, the handling of the process (filling of the supply container, removal of the used coffee grounds) is clearly simplified.

For the desired output amount, a predetermined amount of ground coffee is guided into the brewing chamber, for example by freshly grinding coffee beans in a grinder or by using already ground coffee. This so-called coffee cake, however, is not pressed for the brewing operation. The brewing operation starts with a pre-brewing inside the brewing chamber, without pressure, during a specifiable limited time period and at a specifiable temperature.

A brewing operation is subsequently carried out with the pre-brewed amount of coffee grounds and at a specifiable pressure, wherein the hot water pressure should amount to less than 2 bar.

The brewing operation is stopped before the concentration of the brewed coffee concentrate is below a specifiable multiple of the concentration of a normal drinking quality for filtered coffee, with approximately 1.2 to 1.4% share of dry substance. The specifiable multiple of the concentration amounts to at least five times the concentration used for normal drinking quality.

The coffee concentrate prepared in this way is then mixed with cold water until the desired beverage level is reached. Fresh tap water or water cooled to a specified temperature is mixed in for preparing a fresh cold coffee-based beverage. The cold water can furthermore be supplied from a correspondingly cooled storage container, wherein this water can preferably have a temperature of less than about 35° C., especially preferred of less than about 20% C, or even more preferred a temperature in the range of about 10° C. to about 0° C.

A fresh cold coffee-based beverage can thus be prepared immediately.

Following the complete extraction of the coffee cake, the pressed-out coffee cake is subsequently removed from the brewing chamber and place into a suitable container.

According to an embodiment of a coffee machine according to the invention there may be provided a hot-water feeding tube to the brewing chamber and a cold-water feeding tube to the beverage dispenser. These feeding tubes may be provided with control valves and metering devices. The hot-water feeding tube may contain a heating unit and the cold-water feeding tube a cooling device.

At least one concentration sensor may be arranged on the brewing chamber to determine the concentration of the coffee concentrate. The concentration of the coffee concentrate may also be determined with the aid of values, obtained ahead of time and stored in the control unit, on the basis of the ratio between the amounts of ground coffee used, the degree of grinding, and the amount of water used.

BRIEF DESCRIPTION OF THE DRAWINGS

These and other features and advantages of the invention will be further understood from the following detailed description of embodiments of the invention with reference to the accompanying drawings, to which reference is made for all details not further explained in the description.

DETAILED DESCRIPTION

The same components or functional units having the same function are given the same reference numbers in the Figures.

Figure 1:
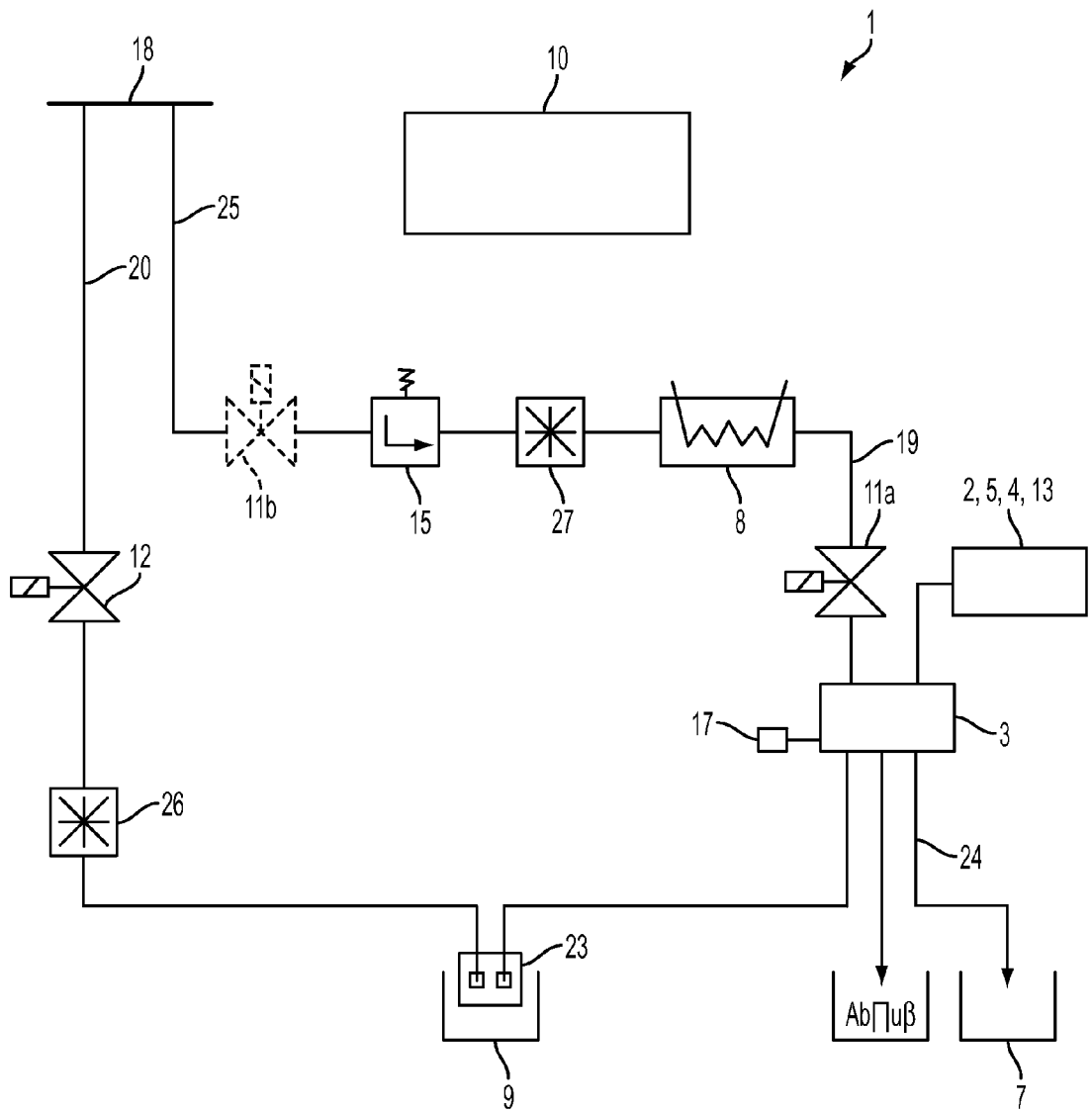
FIG. 1 is a schematic block diagram of an embodiment of a coffee machine according to the invention.

FIG. 1 shows a schematic block diagram of an embodiment of a piston-type coffee machine 1 that may be used to implement the invention.

The embodiment of the coffee machine 1 in FIG. 1 includes a storage device 2 for storing the ground coffee which may be provided with a metering device 5, a brewing chamber 3 with an extraction device, a hot water feeding tube 19 preceded by a heating unit 8 and followed by a hot water valve 11a, a cold water feeding tube 20 followed by a cold water valve 12, a beverage outlet 23, a container 7 and a control unit 10. The control unit 10 is connected to all sensors and actuators (not shown herein) and controls the coffee machine with the aid of commands input by an input device (not shown herein), or pre-programmed with specifiable parameters and sequences that can be adjusted from the outside.

A cold water feeding tube 25 of the hot-water line 19 is provided with a pressure control device 15. A concentration sensor 17 may be arranged on or in the brewing chamber 3. Devices 26, 27 for measuring the amounts can be provided in the hot water feeding tube 19 or in the cold water feeding tube of the hot water line 25, and in the cold water feeding tube 20, as well as in the metering device 5.

The brewing chamber 3, the hot water feeding tube 19 and the cold water feeding tube 20 can furthermore be provided with temperature sensors, not shown herein, which are connected to the control unit 10.

The hot water valve 11a with intake and the cold water valve 12 with its intake areas are jointly connected to a water supply system 18.

The preparation of a fresh cold coffee-based beverage is described in the following.

To prepare a fresh, cold, coffee-based beverage, a desired amount of ground coffee is first moved from the storage device 2 via the metering device 5, which may be arranged between the storage device 2 and the brewing chamber 3, into the brewing chamber 3. A coffee concentrate is then prepared in the brewing chamber 3 through an initial pre-brewing operation with a specifiable amount of hot water supplied by the hot water feeding tube 19 at a specifiable temperature. For this, the hot water valve 11a or 11b is opened, for example electromagnetically, by the control unit 10. Tap water then flows from the tap water system 18 into the heating unit 8, to be heated up. The heated up water then flows into the brewing chamber 3. The ground coffee in the brewing chamber 3 is also referred to as coffee cake and is not pressed. The pre-brewing occurs without pressure. A feed-in pressure of the hot water is monitored by the pressure-control device 15. The control unit 10 controls the feeding of the required amount of hot water via the hot water valve 11a or 11b which can be a control valve.

This pre-brewing operation takes place during a predetermined time period and is controlled by the control unit 10.

The pre-brewing operation is followed by a brewing operation in the brewing chamber 3 at a pressure of less than 2 bar, for example 1.8 bar. The hot water is guided under this pressure, which can be controlled by the pressure-control device 15, via the hot water feeding tube 19 through the brewing chamber 3 which contains the ground coffee.

As soon as the limit value, stored in the control unit for the amount to be brewed in dependence on the amount of ground coffee used, or until the concentration K of the prepared coffee concentrate determined via a concentration sensor 17, has reached a specifiable limit value and drops below it, the control unit 10 stops the brewing operation in the brewing chamber 3 by interrupting the feed-in of the hot water. The specifiable limit value amounts to at least five times the limit value defined for the normal drinking quality of filtered coffee. This normal, defined drinking quality of filtered coffee relates to filtered coffee having a dry substance share of approximately 1.2 to 1.4%.

Following the brewing operation or parallel to the brewing operation, the prepared coffee concentrate is replenished with fresh, cold water from the cold water feeding tube 20 until the desired beverage level is reached. The cold water temperature is preferably less than about 35° C., especially less than about 20° C. and especially preferred in the range of about 10° C. to about 0° C. This temperature can correspond to the temperature of tap water from the water supply system 18, which supplies the cold water in this case, wherein additional cooling devices can also be provided. The temperature of the cold water can be monitored with the aid of temperature sensors, which are not shown herein.

The coffee concentrate and the cold water are conducted to the beverage dispenser 23 and from there into a container 9, for example into a cup or a storage container such as a carafe for coffee.

The pressed out coffee cake is then discharged from the brewing chamber 3 via an outlet 24 into the container 7, and the brewing chamber 3 is again ready for a new brewing operation. The brewing chamber 3 may also be in communication with a drain, as illustrated, for cleaning purposes.

Figure 2:
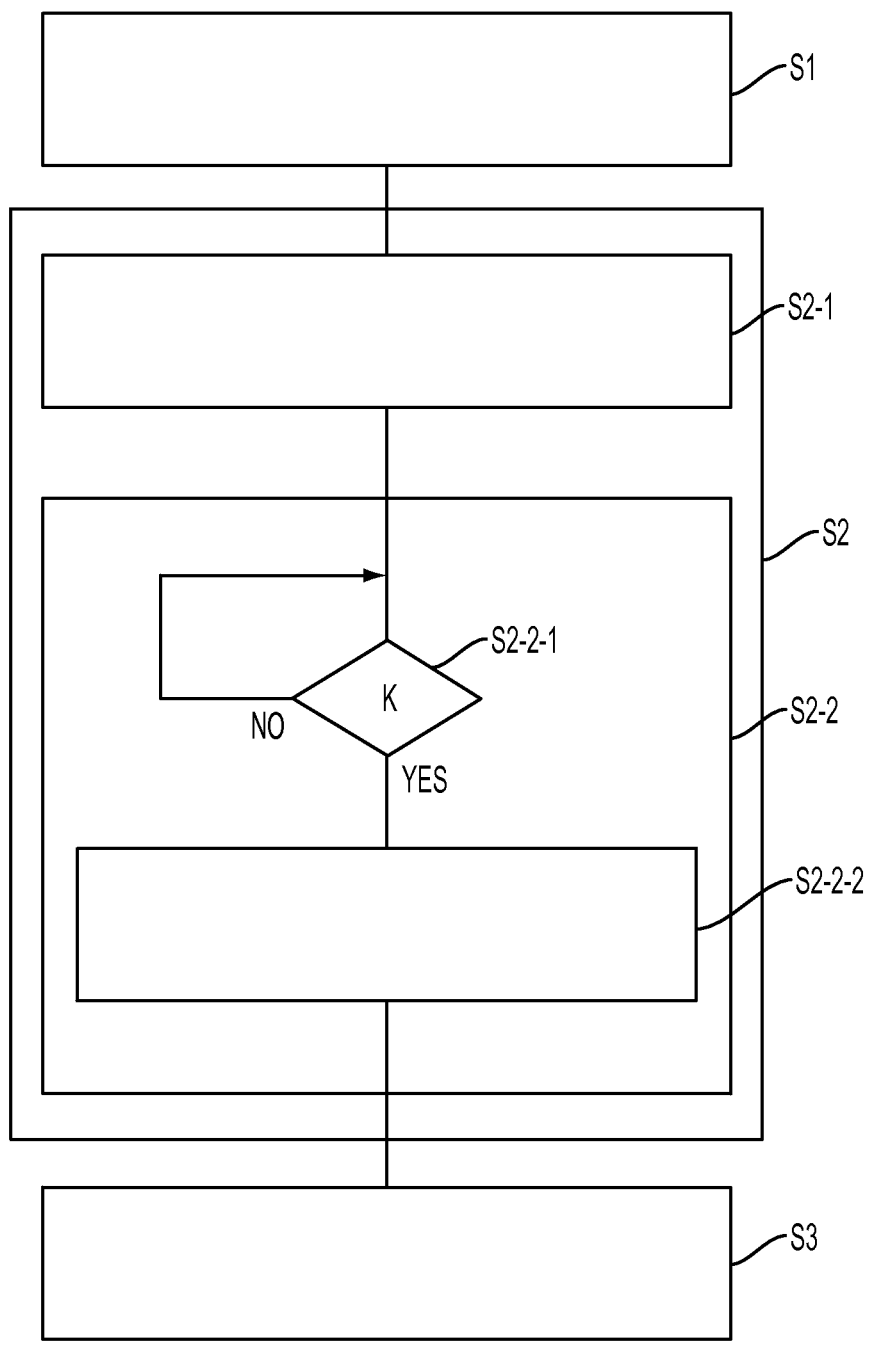
FIG. 2 is a flow chart for an embodiment of a method according to the invention.

FIG. 2 contains a flow chart, showing an embodiment of a method according to the invention for preparing a fresh coffee-based beverage with the above-described coffee machine.

In a first method step S1, a predetermined amount of ground coffee is filled into the brewing chamber 3.

In a second method step S2, a coffee concentrate is brewed with the supplied amount of ground coffee in the brewing chamber 3, wherein the coffee concentrate prepared in this way amounts to multiple times V the concentration KN of the drinking quality for a normal filtered coffee with approximately 1.2 to 1.4% dry substance share.

The coffee concentrate in this case is prepared with the aid of several partial steps. First, the predetermined amount of ground coffee is pre-brewed (S2-1) without pressure during a specifiable, limited time period, and the brewing operation is then continued by pressing hot water at a specifiable pressure of less than 2 bar, e.g. 1.8 bar, through the coffee grounds inside the brewing chamber (S2-2).

In an additional partial step (S2-2-1), a concentration K is determined for the coffee concentrate, either by comparing the amount of coffee grounds used and the volume flow of hot water to the specified values stored in the control unit or by comparing the value analyzed via a concentration sensor to the predetermined value stored in the control unit.

The brewing operation is stopped (S2-2-2) before the concentration K of the brewed coffee concentrate drops below a specifiable multiple VK, at least five times the amount, of the concentration KN for the normal drinking quality of filtered coffee with approximately 1.2 to 1.4% dry substance.

A fresh, cold coffee-based beverage is prepared during a third method step S3 by mixing the coffee concentrate, produced in this way, with an amount of water that corresponds to multiple times VM the amount of the produced fresh coffee concentrate.

The invention is not restricted to the above-described embodiments, but can be modified within the framework of the attached claims.

For example, it is conceivable that a user of the coffee machine can pre-select the output temperature of the fresh, cold beverage.

It will be understood that the above description of the present invention is susceptible to various modifications, changes and adaptations, and the same are intended to be comprehended within the meaning and range of equivalents of the appended claims.

What is claimed is:

1. An automatically controlled coffee machine for preparing a fresh, cold, coffee-based beverage, comprising:
   a storage container for ground coffee or whole-bean coffee ground as needed with a grinding device;
   a first cold water feeding tube;
   a pressure-control device connected in the first cold water feeding tube to provide a required water pressure;
   a brewing chamber to prepare fresh coffee concentrate from the ground coffee;
   a metering device to meter the ground coffee from the storage device or the grinding device into the brewing chamber;
   a heating unit coupled to the first cold water feeding tube
   a hot water feeding tube coupled to the heating unit and coupled between the pressure-control device and the brewing chamber to pre-brew and brew the coffee concentrate, wherein the hot water feeding tube feeds in hot water to the brewing chamber;
   a monitoring unit configured to determine a concentration for the brewed coffee concentrate in the brewing chamber;
   a control device configured to interrupt the feed in of hot water to the brewing chamber when the monitoring unit determines the concentration of the brewed coffee concentrate in the brewing chamber reaches a specified limit and drops below the specified limit;
   a beverage dispenser connected to the brewing chamber to dispense the brewed coffee concentrate;
   a second cold water feeding tube connected to a dispenser; and
   a mixing chamber to mix the coffee concentrate with cold water from the second cold water feeding tube.

2. The coffee machine according to claim 1, further including a cold water valve to control the second cold water feeding tube.

3. The coffee machine according to claim 1, wherein the control device includes a store of predetermined values with which the amount of ground coffee and the volume flow of hot water is compared to determine the concentration of the brewed coffee concentrate.

4. The coffee machine according to one claim 1, further including at least one concentration sensor arranged in the brewing chamber.

5. The coffee machine according to claim 1, wherein the storage container for ground coffee comprises a storage section to accommodate coffee beans and a grinding device.

6. The coffee machine according to claim 1, wherein the first and second cold water feeding tubes are adapted to be supplied with tap water from a water supply system or with water from a cooled container.

7. The coffee machine according to claim 1, wherein the cold water has a water temperature of less than about 35° C.

8. The coffee machine according to claim 1, wherein the cold water has a water temperature of less than about 20° C.

9. The coffee machine according to claim 1, wherein the cold water has a temperature in a range from about 10° C. to about 0° C.

10. The coffee machine according to claim 1, further comprising a device to remove brewed and extracted coffee cake from the brewing chamber.

11. The coffee machine according to claim 1, wherein the coffee machine is of the piston-type.

* * * * *